US012722458B2

(12) United States Patent
Yang et al.

(10) Patent No.: US 12,722,458 B2
(45) Date of Patent: Sep. 1, 2026

(54) DEPLOYMENT DEVICE

(71) Applicants: HYUNDAI MOTOR COMPANY, Seoul (KR); KIA CORPORATION, Seoul (KR); MACAUTO INDUSTRIAL CO., LTD., Tainan City (TW)

(72) Inventors: Hyeon Tae Yang, Seoul (KR); Yeong Rae Jo, Incheon (KR); Won Jong Lee, Suwon-si (KR); Jae Han Shim, Icheon-si (KR); Yu Hsien Chien, Tainan City (TW); Hung Ming Yen, Tainan City (TW)

(73) Assignees: Hyundai Motor Company, Seoul (KR); Kia Corporation, Seoul (KR); MACAUTO INDUSTRIAL CO., LTD., Taiwan (CN)

(*) Notice: Subject to any disclaimer, the term of this patent is extended or adjusted under 35 U.S.C. 154(b) by 335 days.

(21) Appl. No.: 18/399,175

(22) Filed: Dec. 28, 2023

(65) Prior Publication Data

US 2025/0065700 A1 Feb. 27, 2025

(30) Foreign Application Priority Data

Aug. 24, 2023 (KR) ........................ 10-2023-0111286

(51) Int. Cl.
*B60J 3/02* (2006.01)

(52) U.S. Cl.
CPC ........... *B60J 3/0252* (2013.01); *B60J 3/0217* (2013.01)

(58) Field of Classification Search
CPC .............................. B60J 3/0252; B60J 3/0217
See application file for complete search history.

(56) References Cited

U.S. PATENT DOCUMENTS 8,281,847 B2 * 10/2012 Uehara .................. B60J 7/0015 160/265
2012/0048488 A1 * 3/2012 Oh ........................... B60J 1/208 160/370.22

FOREIGN PATENT DOCUMENTS

CN 107743451 A * 2/2018 ............ B60J 7/0015
EP 2620304 B1 * 11/2018 ............ B60J 1/2038

* cited by examiner

*Primary Examiner* — Faye M Fleming
(74) *Attorney, Agent, or Firm* — Fish & Richardson P.C.

(57) ABSTRACT

A deployment device includes a body portion in which a sunshade is wound and accommodated therein, a shade bar disposed at one end of the sunshade, a rail portion disposed on one side or the other side of the body portion, a first wire assembly at least partially disposed within the body portion, a second wire assembly at least partially disposed within the rail portion, one end of the shade bar being disposed in the second wire assembly, and a driver disposed in the body portion and slidably moving the first wire assembly. The first wire assembly includes a first wire and a first connection portion, the second wire assembly includes a second wire and a second connection portion, and the first wire assembly and the second wire assembly are connected by the first connection portion and the second connection portion.

13 Claims, 10 Drawing Sheets

DEPLOYMENT DEVICE

CROSS-REFERENCE TO RELATED APPLICATION

This application claims benefit of priority to Korean Patent Application No. 10-2023-0111286, filed on Aug. 24, 2023, in the Korean Intellectual Property Office, the disclosure of which is incorporated herein by reference in its entirety.

TECHNICAL FIELD

The present disclosure relates to a deployment device.

BACKGROUND

A vehicle may be equipped with various convenience devices. The convenience devices may be operated by electric power. For example, there may be provided a sunshade for blocking a portion of the sunlight entering the vehicles' windows or a cargo screen for partitioning vehicles' trunk space. Sunshade devices or cargo screens may be deployed by an operation of an electric device. Deployment devices for operating sunshade devices or cargo screens have been produced as a single assembly and attached to vehicles in the related art. However, since the interior of vehicles has a three-dimensional structure, a deployment device produced as a single assembly in vehicles may be installed with additional parts for assembly, which may increase labor hours.

SUMMARY

An aspect of the present disclosure is to provide a deployment device capable of arranging individual components in an internal space of a vehicle and an in an internal cargo space at the rear of the vehicle and mechanically coupling the components.

According to an aspect of the present disclosure, a deployment device includes: a body portion in which a sunshade is wound and accommodated therein; a shade bar disposed at one end of the sunshade; a rail portion disposed on one side or the other side of the body portion; a first wire assembly at least partially disposed within the body portion; a second wire assembly at least partially disposed within the rail portion, one end of the shade bar being disposed in the second wire assembly; and a driver disposed in the body portion and slidably moving the first wire assembly. The first wire assembly includes a first wire and a first connection portion, the second wire assembly includes a second wire and a second connection portion, and the first wire assembly and the second wire assembly are connected by the first connection portion and the second connection portion.

The first connection portion may include a first sub connection portion disposed at one end of the first wire and a second sub connection portion disposed at the other end of the first wire, the second connection portion may include a third sub connection portion disposed at one end of the second wire and a fourth sub connection portion disposed at the other end of the second wire, and the first sub connection portion may be coupled to the third sub connection portion, and the second sub connection portion may be coupled to the fourth sub connection portion.

The first sub connection portion and the third sub connection portion may be movably disposed on the body portion.

The rail portion may include a rail groove, and the second sub connection portion may be disposed to be movable along the rail groove.

The shade bar may have one end coupled to the second sub connection portion and pulled along the rail groove.

The first connection portion may be a first drum on which at least a portion of the first wire is wound, the second connection portion may be a second drum on which at least a portion of the second wire is wound, and a rotation axis of the first drum and a rotation axis of the second drum may be connected in parallel to each other.

The rail portion may include a rail groove, a traction portion is disposed in the second wire, and one end of the shade bar may be coupled to the traction portion and pulled along the rail groove.

According to another aspect of the present disclosure, a deployment device includes: a body portion to which one end of a screen plate is hinged; a plate bar coupled to the other end of the screen plate; a rail portion disposed on one side or the other side of the body portion; a first wire assembly at least partially disposed within the body portion; a second wire assembly at least partially disposed within the rail portion, one end of the plate bar being disposed in the second wire assembly; and a driver disposed in the body portion and slidably moving the first wire assembly, wherein the first wire assembly includes a first wire and a first connection portion, the second wire assembly includes a second wire and a second connection portion, and the first wire assembly and the second wire assembly are connected by the first connection portion and the second connection portion.

The first connection portion may include a first sub connection portion disposed at one end of the first wire and a second sub connection portion disposed at the other end of the first wire, the second connection portion may include a third sub connection portion disposed at one end of the second wire and a fourth sub connection portion disposed at the other end of the second wire, the first sub connection portion may be coupled to the third sub connection portion, and the second sub connection portion may be coupled to the fourth sub connection portion.

The first sub connection portion and the third sub connection portion may be movably disposed on the body portion.

The first connection portion may be a first drum on which at least a portion of the first wire is wound, the second connection portion may be a second drum on which at least a portion of the second wire is wound, and a rotation axis of the first drum and a rotation axis of the second drum may be connected in parallel to each other.

The screen plate may include a first screen plate and a second screen plate, and the first screen plate and the second screen plate may be arranged side by side and hinged to each other.

The rail portion may be coupled to a pillar trim disposed inside a vehicle.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

The present disclosure may be modified variably and may have various exemplary implementations, particular examples of which will be illustrated in drawings and described in detail. However, it is to be understood that the present disclosure is not limited to a specific disclosed form, but includes all modifications, equivalents, and substitutions without departing from the scope and spirit of the present disclosure.

Hereinafter, implementations of the present disclosure will be described in detail with reference to the accompanying drawings.

Figure 1:
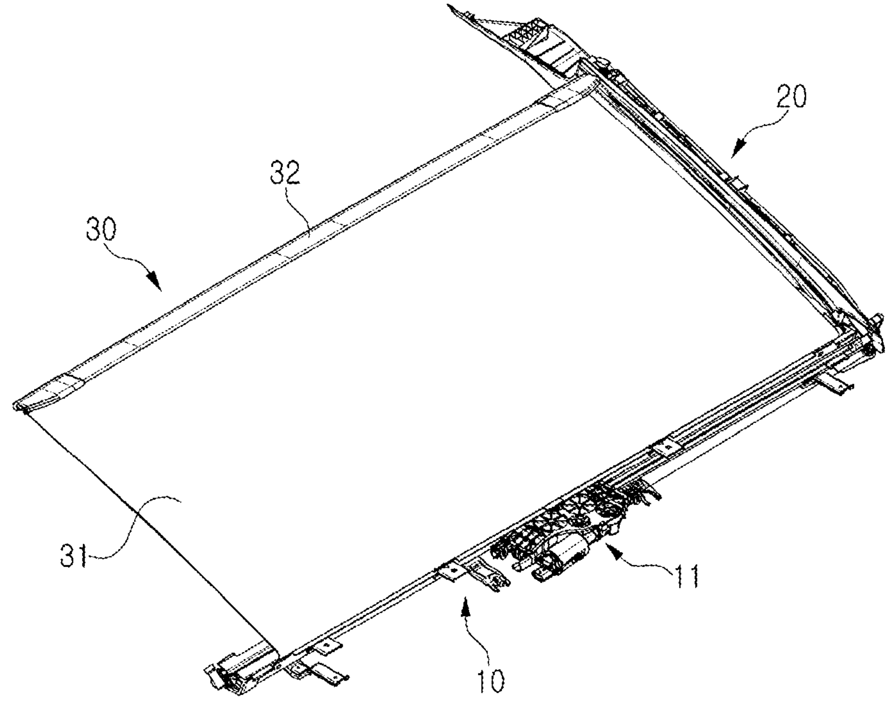
FIG. 1 is a view illustrating a portion of an example of a deployment device from which a sunshade device is deployed.
Figure 2:
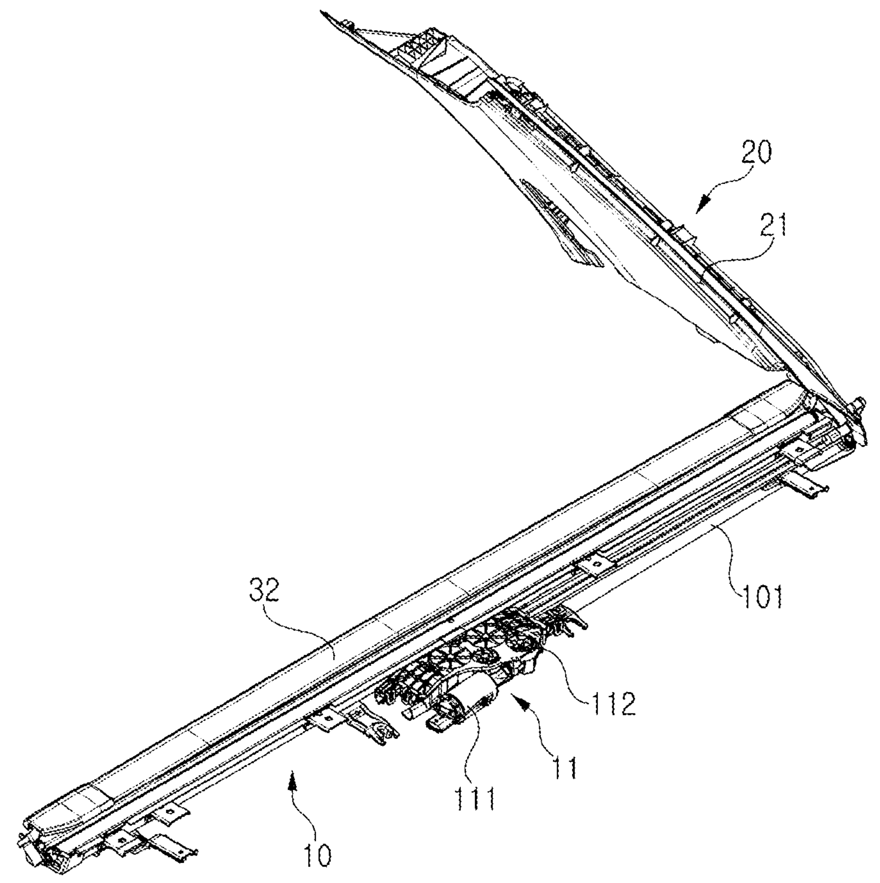
FIG. 2 is a view illustrating a portion of the deployment device that accommodates the sunshade device in a body portion.

FIG. 1 is a view illustrating a portion of a deployment device in which a sunshade device is deployed, and FIG. 2 is a view illustrating a portion of the deployment device in which the sunshade device is accommodated in a body portion.

In some implementations, the deployment device may include a body portion 10 and a rail portion 20. The body portion 10 may be disposed at the rear inside a vehicle. The body portion 10 may be disposed to be adjacent to a lower side of a rear window of the vehicle. In the drawing, the rail portion 20 is shown on one side of the body portion 10, but the rail portion 20 may be disposed on one side or the other side of the body portion 10.

In some examples, the rail portion 20 may be disposed on one side and the other side of the body portion 10, respectively. When the rail portion 20 is disposed on one side and the other side of the body portion 10, a plurality of first wire assemblies 100 and a plurality of second wire assemblies 200, which will be described below, may also be arranged.

The rail portion 20 may be disposed in an internal space of the vehicle. The rail portion 20 may be disposed on a pillar inside the vehicle. For example, the rail portion 20 may be disposed on a C-pillar. The rail portion 20 may be formed integrally with a pillar trim disposed in the interior of the vehicle. Alternatively, the rail portion 20 may be coupled to the pillar trim disposed in the interior of the vehicle.

In some implementations, the body portion 10 and the rail portion 20 may be independent of each other. The body portion 10 and the rail portion 20 may be separately disposed and coupled to each other inside the vehicle without being attached to each other. After the body portion 10 and the rail portion 20 are separately disposed and assembled inside the vehicle, portions of the body portion 10 and the rail portion 20 may be coupled to each other.

A deployment target of the deployment device may be a sunshade device 30. The sunshade device 30 may include a shade bar 32 and a sunshade screen 31. The sunshade 31 may be wound around the body portion 10. The sunshade 31 may be wound and stored in a space of the body portion 10. One end of the sunshade 31 may be coupled to the shade bar 32. The deployment device may deploy the sunshade 31 by pulling the shade bar 32. The shade bar 32 may be deployed along the rail portion 20. The shade bar 32 may be deployed along a rail groove 21 disposed in the rail portion 20.

The deployment device may deploy the sunshade 31 wound around the body portion 10 by pulling the shade bar 32. The deployment device may deploy the sunshade 31 by pulling the shade bar 32 in a direction away from the body portion 10. In some examples, the deployment device may pull the shade bar 32 in a direction closer to the body portion 10. When the shade bar 32 approaches the body portion 10, the sunshade 31 may be wound around an accommodating space provided inside the body portion 10 by an elastic member disposed within the body portion 10.

Figure 3:
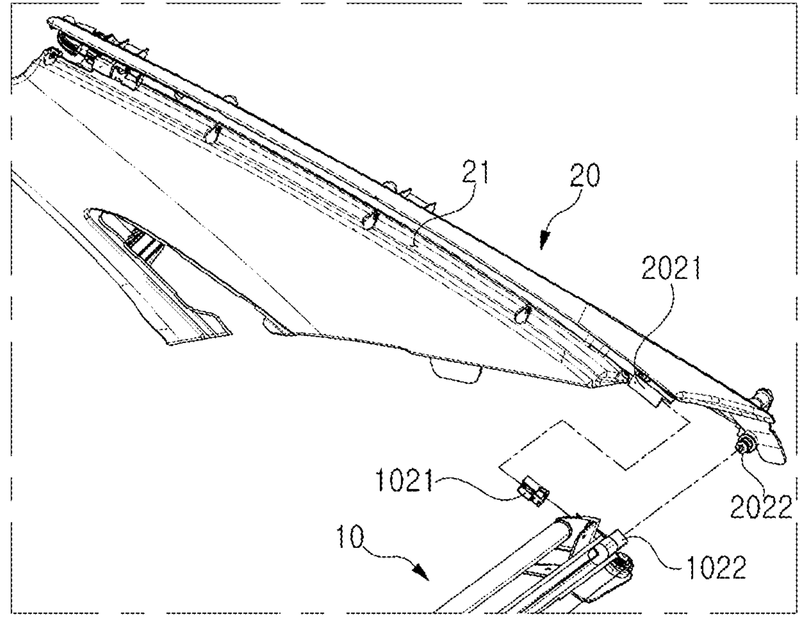
FIG. 3 is a view illustrating an example structure in which the body portion and a rail portion are connected.
Figure 4:
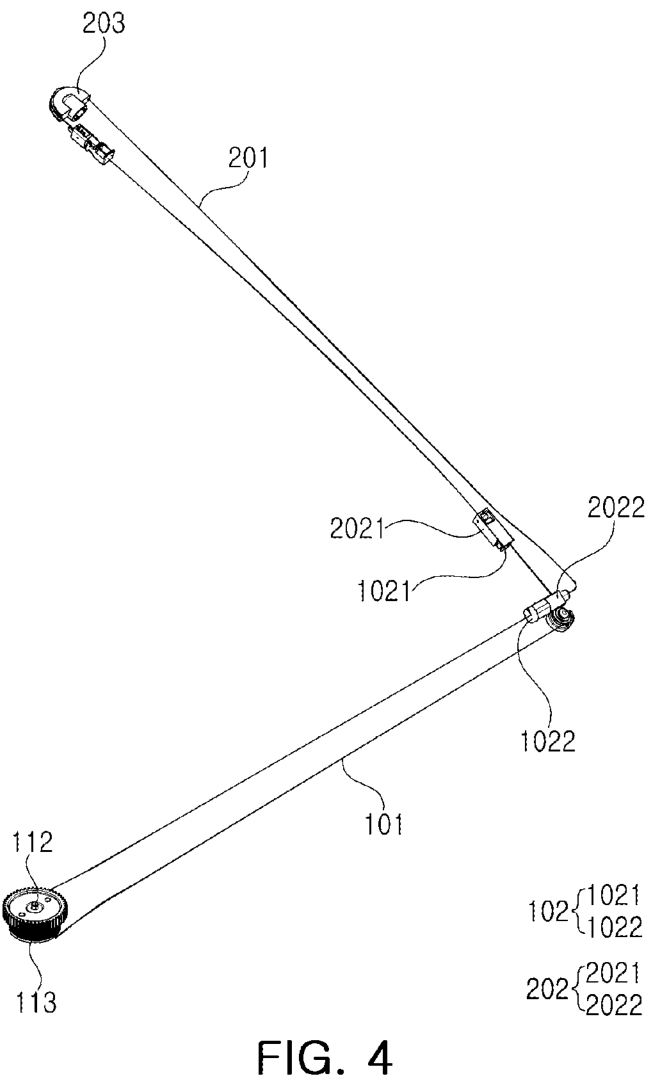
FIG. 4 is a view illustrating an example of a connection structure of a first wire assembly disposed in a body portion and a second wire assembly disposed in a rail portion.
Figure 5:
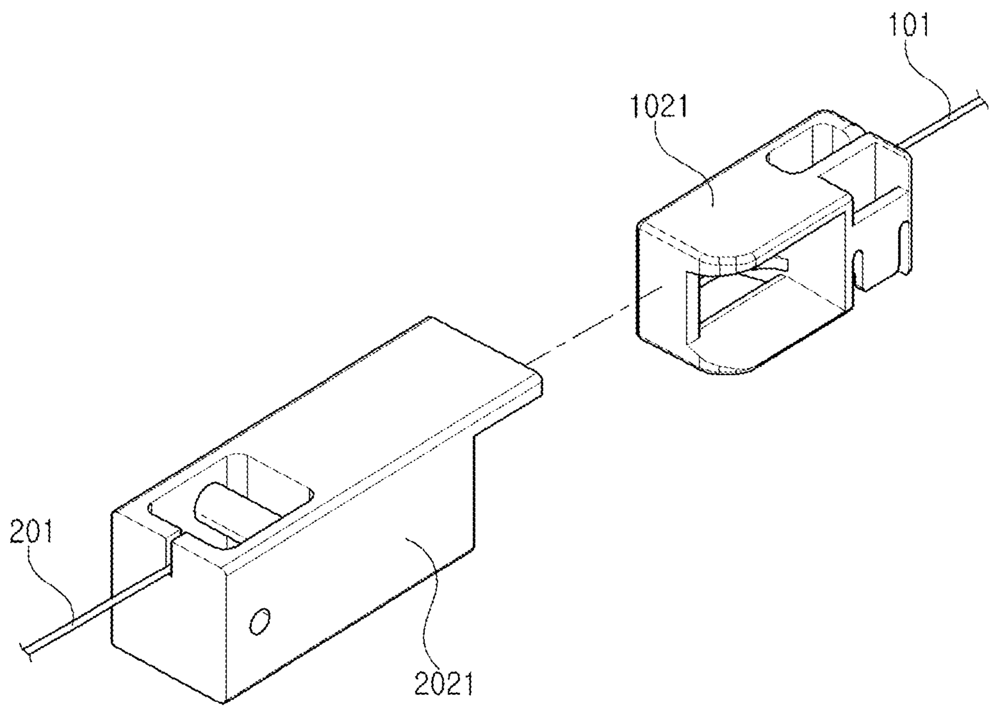
FIG. 5 is a view illustrating an example of a first connection portion.
Figure 6:
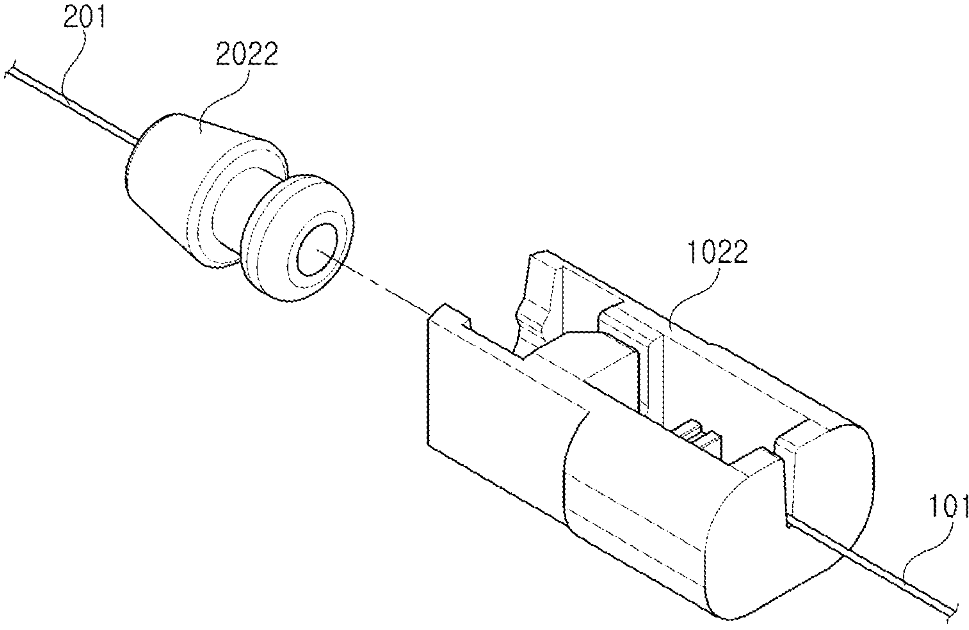
FIG. 6 is a view illustrating an example of a second connection portion.

FIG. 3 is a view illustrating a structure in which the body portion and a rail portion are connected, FIG. 4 is a view illustrating a connection structure of a first wire assembly disposed in a body portion and a second wire assembly disposed in a rail portion, FIG. 5 is a view illustrating a first connection portion, and FIG. 6 is a view illustrating the second connection portion.

A driver 11 and a wire assembly may be disposed in the body portion 10. The wire assembly disposed in the body portion 10 may be referred to as a first wire assembly 100.

The driver 11 may provide power. For example, the driver 11 may include a motor 111 providing power. In another example, the driver 11 may include a gear portion 112. In some examples, the driver 11 may include a pulley 113. The gear portion 112 may be rotated by power provided from the motor 111. At least a portion of a first wire 101 may be disposed on the pulley 113. At least a portion of the first wire 101 may be wound around the pulley 113. The motor 111 may rotate the gear portion 112, and the pulley 113 may be rotated by the gear portion 112 that rotates. The pulley 113 may rotate to slide the first wire 101.

The wire assembly may include a wire and a connection portion. A wire included in the first wire assembly 100 may be referred to as the first wire 101, and a connection portion disposed in the first wire assembly 100 may be referred to as a first connection portion 102. At least a portion of the first wire 101 may be disposed in the driver 11. At least a portion of the first wire 101 may be disposed in the pulley 113 of the driver 11. At least a portion of the first wire 101 may be wound around the pulley 113 of the driver 11. At least a portion of the first wire 101 may be wound around the pulley 113, and as the pulley 113 rotates, the first wire 101 may slide and move on a surface of the pulley 113. At least a portion of the first wire 101 may be wound around the pulley 113 one to three times.

The first connection portion 102 may be connected to a second connection portion 202, which will be described below. The first connection portion 102 may be connected to the second connection portion 202 and may slide a second wire 201, which will be described below. The first connection portion 102 may include a first sub connection portion 1021 and a second sub connection portion 1022. The first sub connection portion 1021 may be disposed at one end of the first wire 101. The second sub connection portion 1022 may be disposed at the other end of the first wire 101.

One end of the first wire 101 may be disposed in the first sub connection portion 1021. One end of the first wire 101 may be fixed or coupled to the first sub connection portion 1021. The first sub connection portion 1021 may be coupled to the third sub connection portion 2021, which will be described below. A groove may be disposed in any one of the first sub connection portion 1021 and the third sub connection portion 2021, and at least a portion of the other of the first sub connection portion 1021 and the third sub connection portion 2021 may be inserted into the groove. The first sub connection portion 1021 may be disposed to be movable along the rail groove of the rail portion 20.

The other end of the first wire 101 may be disposed in the second sub connection portion 1022. The other end of the first wire 101 may be fixed or coupled to the second sub connection portion 1022. The second sub connection portion 1022 may be coupled to the fourth sub connection portion 2022, which will be described below. A groove may be disposed in any one of the second sub connection portion 1022 and the fourth sub connection portion 2022, and at least a portion of the other of the second sub connection portion 1022 and the fourth sub connection portion 2022 may be inserted into the groove. The second sub connection portion 1022 may move along the body portion 10. The second sub connection portion 1022 may move in a longitudinal direction of the body portion 10 by the sliding first wire 101.

A rail groove and a wire assembly may be disposed in the rail portion 20. The wire assembly disposed on the rail portion 20 may be referred to as the second wire assembly 200. The rail groove may be formed along the rail portion 20. The rail groove may be disposed in the longitudinal direction of the rail portion 20. At least a portion of the second wire assembly 200 may be disposed in the rail groove. A first sub connection portion 1021 and a third sub connection portion 2021 may be disposed in the rail groove. The rail groove may guide movement of the first sub connection portion 1021 and the third sub connection portion 2021.

The second wire assembly 200 may include the second wire 201 and the second connection portion 202. The second connection portion 202 may include a third sub connection portion 2021 and a fourth sub connection portion 2022. The second wire 201 may be disposed in the rail portion 20. The second wire 201 may slide in the rail portion 20. When one side of the rail portion 20 is adjacent to the body portion 10, an upper pulley 113 may be disposed on the other side of the rail portion 20.

At least a portion of the second wire 201 may be disposed in the upper pulley 113. At least a portion of the second wire 201 may be wound on the surface of the upper pulley 113. The upper pulley 113 may guide the second wire 201 that slides. The second wire 201 may form a hairpin structure by the upper pulley 113. The second wire 201 may slide in the hairpin structure by the upper pulley 113.

The third sub connection portion 2021 may be disposed at one end of the second wire 201. The third sub connection portion 2021 may be coupled to one end of the second wire 201. The third sub connection portion 2021 may be connected to the first sub connection portion 1021. The third sub connection portion 2021 may be coupled to the first sub connection portion 1021. The third sub connection portion 2021 may move along the second wire 201 sliding in the rail portion 20. The third sub connection portion 2021 may move along the rail groove. The third sub connection portion 2021 may be coupled to the first sub connection portion 1021 and move along the rail groove.

The fourth sub connection portion 2022 may be disposed at the other end of the second wire 201. The fourth sub connection portion 2022 may be coupled to the other end of the second wire 201. The fourth sub connection portion 2022 may be coupled to the second sub connection portion 1022. The fourth sub connection portion 2022 may move along the body portion 10 together with the second sub connection portion 1022.

The shade bar 32 may be disposed in at least a portion of the second wire assembly 200. The second wire assembly 200 may be connected to the shade bar 32. The second wire assembly 200 may slidably move by the first wire assembly 100 to pull the shade bar 32. The sunshade 31 may be deployed by the pulled shade bar 32.

Hereinafter, descriptions of the same component and contents as those described above may be omitted.

Figure 7:
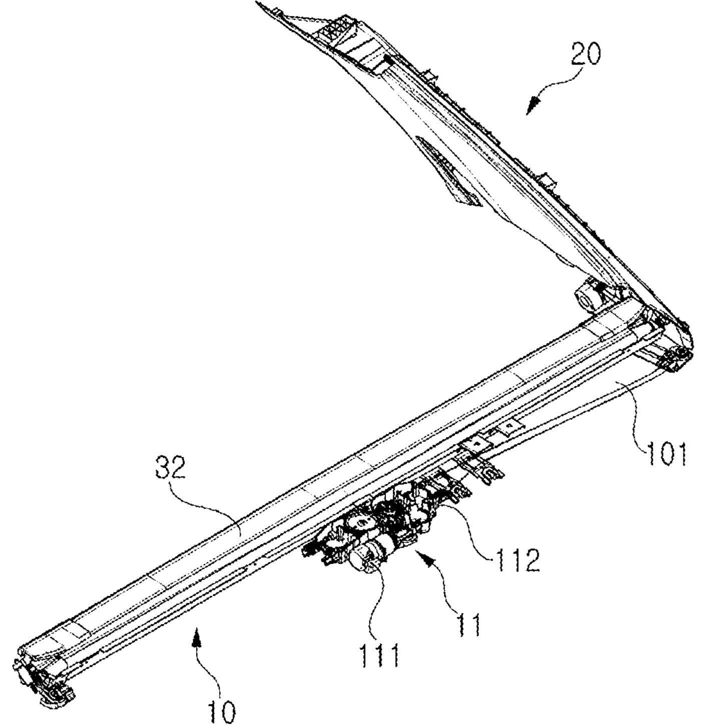
FIG. 7 is a view illustrating a portion of an example of a deployment device that accommodates a sunshade device in a body portion.
Figure 8:
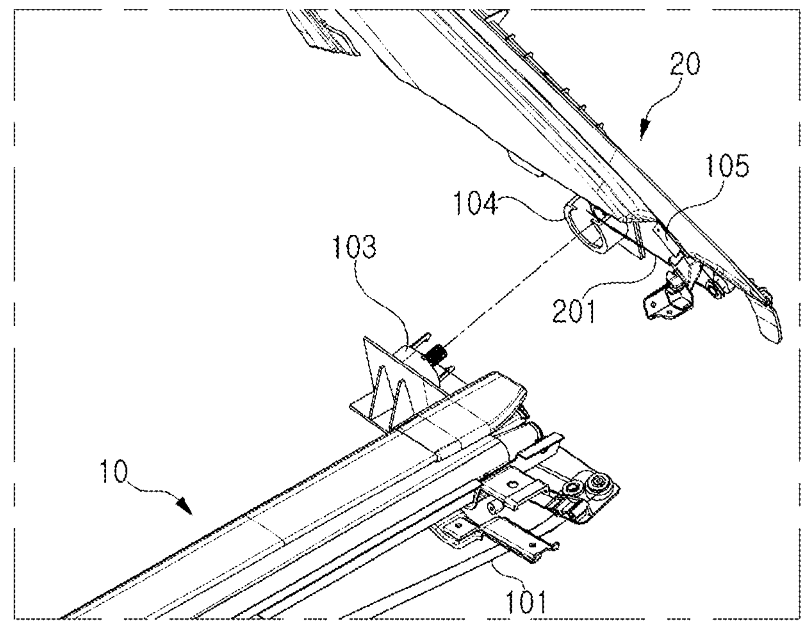
FIG. 8 is a view illustrating an example structure in which the body portion of FIG. 7 and a rail portion are connected.
Figure 9:
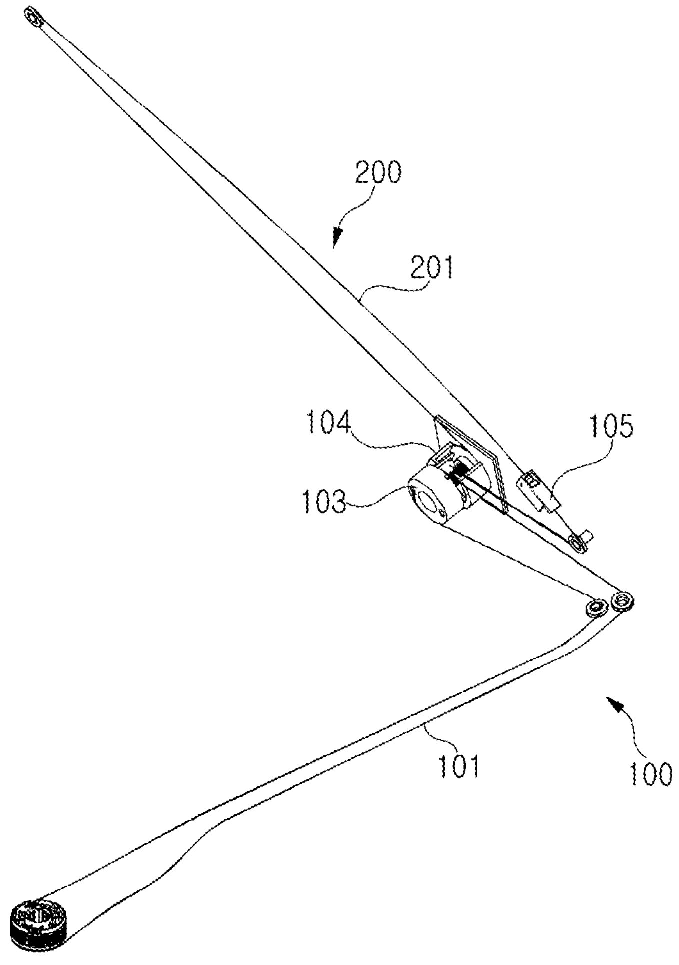
FIG. 9 is a view illustrating an example structure in which a first wire assembly disposed in the body portion of FIG. 7 and a second wire assembly disposed in a rail portion are connected.
Figure 10:
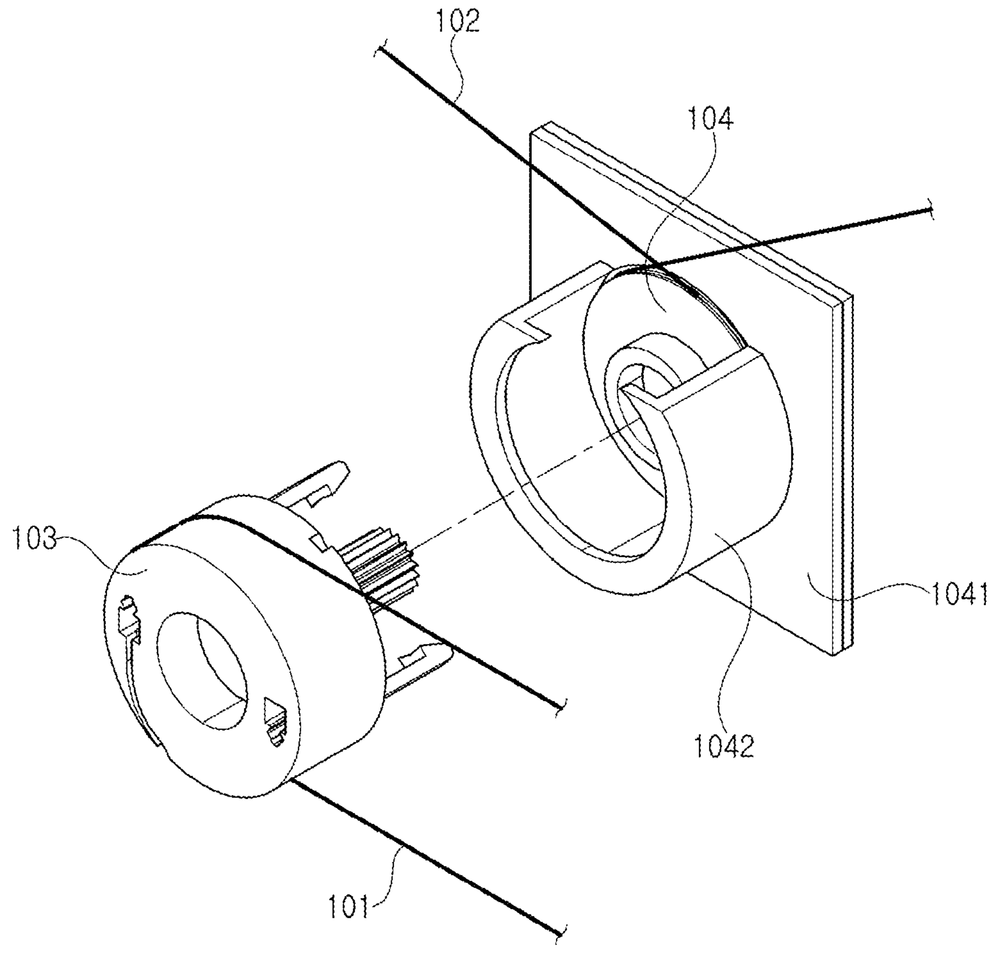
FIG. 10 is a view illustrating an example structure in which a first connection portion and a second connection portion are coupled to each other.

FIG. 7 is a view illustrating a portion of a deployment device in which a sunshade device is accommodated in a body portion according to another exemplary implementation, FIG. 8 is a view illustrating a structure in which a body portion and a rail portion are connected according to another exemplary implementation, FIG. 9 is a view illustrating a structure in which a first wire assembly disposed in a body portion and a second wire assembly disposed in a rail portion are connected according to another exemplary implementation, and FIG. 10 is a view illustrating a structure in which a first connection portion and a second connection portion are coupled to each other according to another exemplary implementation.

The driver 11 and a wire assembly may be disposed in the body portion 10. The wire assembly may include a wire and a connection portion. A wire assembly disposed in the body portion 10 may be referred to as the first wire assembly 100. A wire included in the first wire assembly 100 may be referred to as the first wire 101, and a connection portion disposed in the first wire assembly 100 may be referred to as the first connection portion 102. The first connection portion 102 may be a drum. The drum that is the first connection portion 102 may be referred to as a first drum 103. The first wire 101 may be connected to the second wire 201, which will be described below, through the first drum 103.

The first wire 101 may have a belt shape. One end and the other end of the first wire 101 may be connected to each other. At least a portion of the first wire 101 may be disposed in the driver 11. At least a portion of the first wire 101 may be disposed in the pulley 113 of the driver 11. At least a portion of the first wire 101 may be wound around the pulley 113 of the driver 11. At least a portion of the first wire 101 is wound around the pulley 113, and as the pulley 113 rotates, the first wire 101 may slide and move on the surface of the pulley 113.

Another portion of the first wire 101 may be disposed in the first drum 103. At least a portion of the first wire 101 may be wound around the first drum 103. The first wire 101 may slide by the driver 11, and the first drum 103 may rotate by the first wire 101 that slides.

The second wire 201 may have a belt shape. One end and the other end of the second wire 201 may be connected to each other. At least a portion of the second wire 201 may be disposed in the second drum 104. The second wire 201 may slide and move as the second drum 104 rotates.

The first drum 103 and the second drum 104 may be coupled to each other. The second drum 104 may rotate due to rotation of the first drum 103. Rotation axes of the first drum 103 and the second drum 104 may be parallel. The rotation axes of the second drum 104 and the second drum 104 may be arranged on the same line. The first drum 103 and the second drum 104 may share a rotation axis.

The second drum 104 may be disposed in the first support portion 1041. The first support portion 1041 may be disposed in or coupled to the rail portion 20. The second drum 104 may be rotatably disposed in the first support portion 1041. The first support portion 1041 may be a structure supporting rotation of the second drum.

A second support portion 1042 may be disposed on one side of the first support portion 1041. The second support portion 1042 may protrude from one side of the first support portion 1041. The second support portion 1042 may have a cylindrical structure in which a portion thereof is cut in a direction, parallel to the central axis. At least a portion of the first drum 103 may be inserted into the second support portion 1042. The second support portion 1042 may have a structure supporting rotation of the first drum 103.

A traction portion 105 may be disposed in a portion of the second wire 201. The traction portion 105 may move along the rail groove of the rail portion 20 by the second wire 201 that slides. A traction object may be connected to the traction portion. The traction object may be, for example, the shade bar 32 or a plate bar 42.

Figure 11:
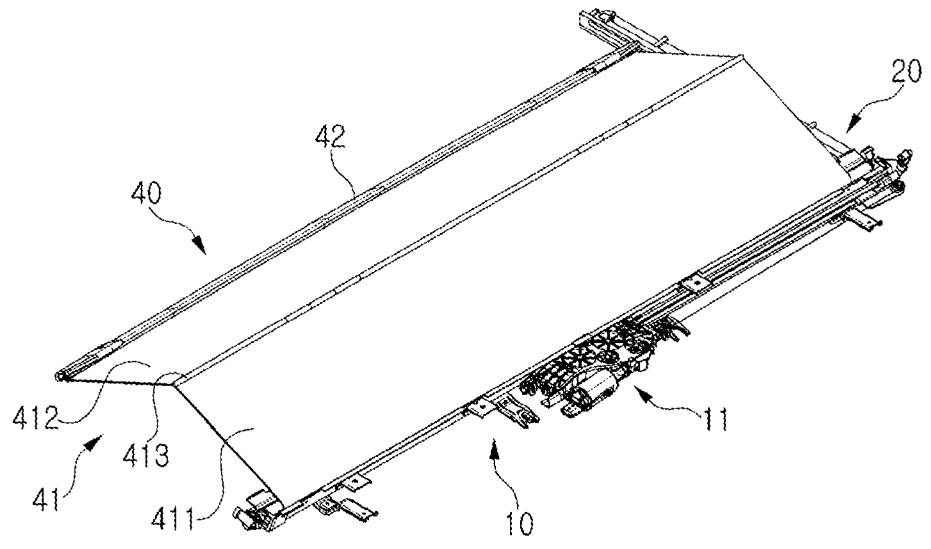
FIG. 11 is a view illustrating an example structure in which a cargo screen is deployed by a deployment device according to the present disclosure.

FIG. 11 is a view illustrating a structure in which a cargo screen is deployed by a deployment device according to the present disclosure. Descriptions of the same components as those of the deployment device described above may be omitted below.

One end of the cargo screen 40 may be disposed in the body portion 10. One end of the cargo screen 40 may be hinged to the body portion 10. The plate bar 42 of the cargo screen 40 may be disposed in the rail portion 20. The plate bar 42 may be pulled along the rail portion 20. The cargo screen 40 may be deployed by pulling the plate bar 42.

The cargo screen 40 may include a screen plate 41 and the plate bar 42. One end of the screen plate 41 may be hinged to the body portion 10. The other end of the screen plate 41 may be coupled to the plate bar 42.

The screen plate 41 may include a first screen plate 411 and a second screen plate 412. The first screen plate 411 and the second screen plate 412 may be arranged side by side. The first screen plate 411, the second screen plate 412, the body portion 10, and the plate bar 42 may be arranged side by side. The first screen plate 411 and the second screen plate 412 may be hinged to each other. The first screen plate 411 and the second screen plate 412 may be hinged by a screen hinge 413.

The plate bar 42 may be pulled along the rail groove by the second wire assembly 200 that slides. The first wire assembly 100 slides by the driver 11 disposed in the body portion 10, the second wire assembly 200 slides by the second wire assembly 200, and the plate bar 42 may be pulled by the second wire assembly 200. As the plate bar 42 is pulled, the cargo screen 40 may be deployed.

In the case of using the deployment device described above, there is an effect of reducing the labor hours when assembling the deployment device to the vehicle.

Specifically, the body portion 10 and the rail portion 20 may be separately disposed in the interior of the vehicle, and the first wire assembly 100 and the second wire assembly 200 may be connected to each other. In this case, the first wire assembly 100 and the second wire assembly 200 may be connected by the first connection portion 102 and the second connection portion 202 described above.

When the first wire assembly 100 and the second wire assembly 200 have the configuration described above with reference to FIGS. 4 to 6, the body portion 10 and the rail portion 20 may be separately disposed in the interior of the vehicle, the first sub connection portion 1021 may be connected to the third sub connection portion 2021, and the second sub connection portion 1022 may be connected to the fourth sub connection portion 2022 to assemble the deployment device.

In addition, when the first wire assembly 100 and the second wire assembly 200 have the configuration described above with reference to FIGS. 8 to 10, the body portion 10 and the rail portion 20 may be separately disposed in the interior of the vehicle and the first drum 103 and the second drum 104 may be connected to assemble the deployment device.

The deployment device according to an exemplary implementation of the present disclosure has the effect of reducing the use of additional assembly parts for installing the deployment device in a vehicle. In addition, there is an effect of reducing labor hours when installing the deployment device in a vehicle.

While example exemplary implementations have been shown and described above, it will be apparent to those skilled in the art that modifications and variations could be made without departing from the scope of the present disclosure as defined by the appended claims.

What is claimed is:

1. A deployment device comprising:

a sunshade configured to be wound;

a body portion configured to accommodate the sunshade that is wound therein;

a shade bar disposed at a first end of the sunshade;

a rail portion disposed on a side of the body portion;

a first wire assembly that is at least partially disposed within the body portion, the first wire assembly comprising a first wire and a first connection portion;

a second wire assembly that is at least partially disposed within the rail portion, the second wire assembly comprising a second wire and a second connection portion, a first end of the shade bar being disposed at the second wire assembly; and a driver disposed at the body portion and configured to move the first wire assembly, wherein the first connection portion and the second connection portion connect the first wire assembly and the second wire assembly to each other.

2. The deployment device according to claim 1, wherein the first connection portion comprises:

a first sub connection portion disposed at a first end of the first wire; and a second sub connection portion disposed at a second end of the first wire, and wherein the second connection portion comprises:

a third sub connection portion disposed at a first end of the second wire and coupled to the first sub connection portion, and a fourth sub connection portion disposed at a second end of the second wire and coupled to the second sub connection portion.

3. The deployment device according to claim 2, wherein the first sub connection portion and the third sub connection portion are movably disposed at the body portion.

4. The deployment device according to claim 2, wherein the rail portion defines a rail groove, and wherein the second sub connection portion is configured to be movable along the rail groove.

5. The deployment device according to claim 4, wherein the first end of the shade bar is coupled to the second sub connection portion and configured to be pulled along the rail groove.

6. The deployment device according to claim 1, wherein the first connection portion further comprises a first drum, at least a portion of the first wire being wound around the first drum, wherein the second connection portion further comprises a second drum, at least a portion of the second wire being wound around the second drum, and wherein a rotation axis of the first drum and a rotation axis of the second drum are connected to each other and extend parallel to each other.

7. The deployment device according to claim 6, wherein the rail portion defines a rail groove, and wherein the rail portion comprises a traction portion that is disposed at the second wire and coupled to the first end of the shade bar, the first end of the shade bar being configured to be pulled along the rail groove.

8. A deployment device comprising:

a body portion;

a screen plate, the screen plate having a first end hinge-coupled to the body portion;

a plate bar coupled to a second end of the screen plate;

a rail portion disposed at a side of the body portion;

a first wire assembly that is at least partially disposed within the body portion, the first wire assembly comprising a first wire and a first connection portion;

a second wire assembly that is at least partially disposed within the rail portion, the second wire assembly comprising a second wire and a second connection portion, one end of the plate bar being disposed at the second wire assembly; and a driver disposed at the body portion and configured to move the first wire assembly, wherein the first connection portion and the second connection portion connect the first wire assembly and the second wire assembly to each other.

9. The deployment device according to claim 8, wherein the first connection portion further comprises:

a first sub connection portion disposed at a first end of the first wire; and a second sub connection portion disposed at a second end of the first wire, and wherein the second connection portion comprises:

a third sub connection portion disposed at a first end of the second wire and coupled to the first sub connection portion, and a fourth sub connection portion disposed at the other end of the second wire and coupled to the second sub connection portion.

10. The deployment device according to claim 9, wherein the first sub connection portion and the third sub connection portion are movably disposed at the body portion.

11. The deployment device according to claim 8, wherein the first connection portion comprises a first drum, at least a portion of the first wire being wound around the first drum, wherein the second connection portion comprises a second drum, at least a portion of the second wire being wound around the second drum, and wherein a rotation axis of the first drum and a rotation axis of the second drum are connected to each other and extend parallel to each other.

12. The deployment device according to claim 8, wherein the screen plate comprises a first screen plate and a second screen plate that are arranged side by side and hinge-coupled to each other.

13. The deployment device according to claim 1, wherein the rail portion is configured to be coupled to a pillar trim that is disposed inside a vehicle.

* * * * *